(12) United States Patent
Lee et al.

(10) Patent No.: US 9,559,339 B2
(45) Date of Patent: Jan. 31, 2017

(54) SECONDARY BATTERY

(75) Inventors: Chiyoung Lee, Yongin-si (KR);
Seokyoon Yoo, Yongin-si (KR);
Jongseok Moon, Yongin-si (KR);
Joongheon Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 806 days.

(21) Appl. No.: 13/180,324

(22) Filed: Jul. 11, 2011

(65) Prior Publication Data
US 2012/0270099 A1  Oct. 25, 2012

Related U.S. Application Data

(60) Provisional application No. 61/477,134, filed on Apr. 19, 2011.

(51) Int. Cl.
*H01M 4/00* (2006.01)
*H01M 2/02* (2006.01)
(Continued)

(52) U.S. Cl.
CPC .......... *H01M 2/0217* (2013.01); *H01M 2/266* (2013.01); *H01M 2/347* (2013.01); *H01M 10/0436* (2013.01)

(58) Field of Classification Search
CPC .......... H01M 2/22; H01M 2/24; H01M 2/263; H01M 2/26; H01M 10/0587; H01M 10/0463; H01M 2/0217; H01M 2/266; H01M 2/347; H01M 10/0436
(Continued)

(56) References Cited

U.S. PATENT DOCUMENTS 5,045,086 A * 9/1991 Juergens ............... H01M 2/263
29/623.1
6,117,587 A 9/2000 Kitami et al.
(Continued)

FOREIGN PATENT DOCUMENTS

CN 1263222 A 8/2000
CN 101997133 A 3/2011
(Continued)

OTHER PUBLICATIONS

EPO Search Report dated May 3, 2013, for corresponding European Patent Application No. EP 11 18 0116 ( 9 pages).
(Continued)

*Primary Examiner* — Nicholas P D'Aniello
*Assistant Examiner* — Jimmy K Vo
(74) *Attorney, Agent, or Firm* — Lewis Roca Rothgerber Christie LLP

(57) ABSTRACT

A secondary battery includes an electrode assembly having a first electrode plate, a second electrode plate, and a separator between the first electrode plate and the second electrode plate; a first electrode terminal; a first collecting plate having a first region contacting the first electrode plate or the second electrode plate, a second region extending at an angle to the first region, and a first reinforcement part that extends at an angle to both the first region and the second region; a case housing the electrode assembly and the first collecting plate; and a cap assembly sealing the case.

14 Claims, 15 Drawing Sheets

(51) Int. Cl.
*H01M 2/26* (2006.01)
*H01M 2/34* (2006.01)
*H01M 10/04* (2006.01)

(58) Field of Classification Search
USPC .................................. 429/161, 178, 179
See application file for complete search history.

(56) References Cited

U.S. PATENT DOCUMENTS

| | | | |
|---|---|---|---|
| 2006/0024578 | A1 | 2/2006 | Lee |
| 2007/0009793 | A1 | 1/2007 | Kim et al. |
| 2007/0026307 | A1* | 2/2007 | Kim ................ 429/161 |
| 2010/0247989 | A1 | 9/2010 | Kim |
| 2011/0039136 | A1 | 2/2011 | Byun et al. |
| 2011/0052976 | A1 | 3/2011 | Ishii et al. |
| 2011/0159356 | A1* | 6/2011 | Tozuka et al. ........ 429/179 |
| 2011/0195286 | A1* | 8/2011 | Aota et al. ............ 429/94 |

FOREIGN PATENT DOCUMENTS

| | | |
|---|---|---|
| EP | 2 287 942 A1 | 2/2011 |
| EP | 2 299 523 A1 | 3/2011 |
| JP | 10-092405 | 4/1998 |
| JP | 2005-032477 | 2/2005 |
| JP | 2005-267945 | 9/2005 |
| JP | 2007-019017 | 1/2007 |
| KR | 10-0717754 B1 | 5/2007 |
| KR | 10-2011-0017820 | 2/2011 |
| WO | WO 2010001975 A1 * | 1/2010 ............ H01M 2/26 |

OTHER PUBLICATIONS

Machine Translation of JP 2005-267945 dated Sep. 29, 2005, 12 pages.
KIPO Office action dated Dec. 18, 2011, for corresponding Korean Patent application 10-2011-0070835, (5 pages).
JPO Office action dated Jun. 4, 2013, for corresponding Japanese Patent application 2011-178931, (4 pages).
Patent Abstracts of Japan, and English machine translation for Japanese Publication 2005-032477 dated Feb. 3, 2005, listed above, (21 pages).
SIPO Office action dated Mar. 17, 2014, for corresponding Chinese Patent application 201110314720.1, (7 pages).
EPO Office action dated Nov. 16, 2015, for corresponding European Patent application 11180116.3, (7 pages).

* cited by examiner

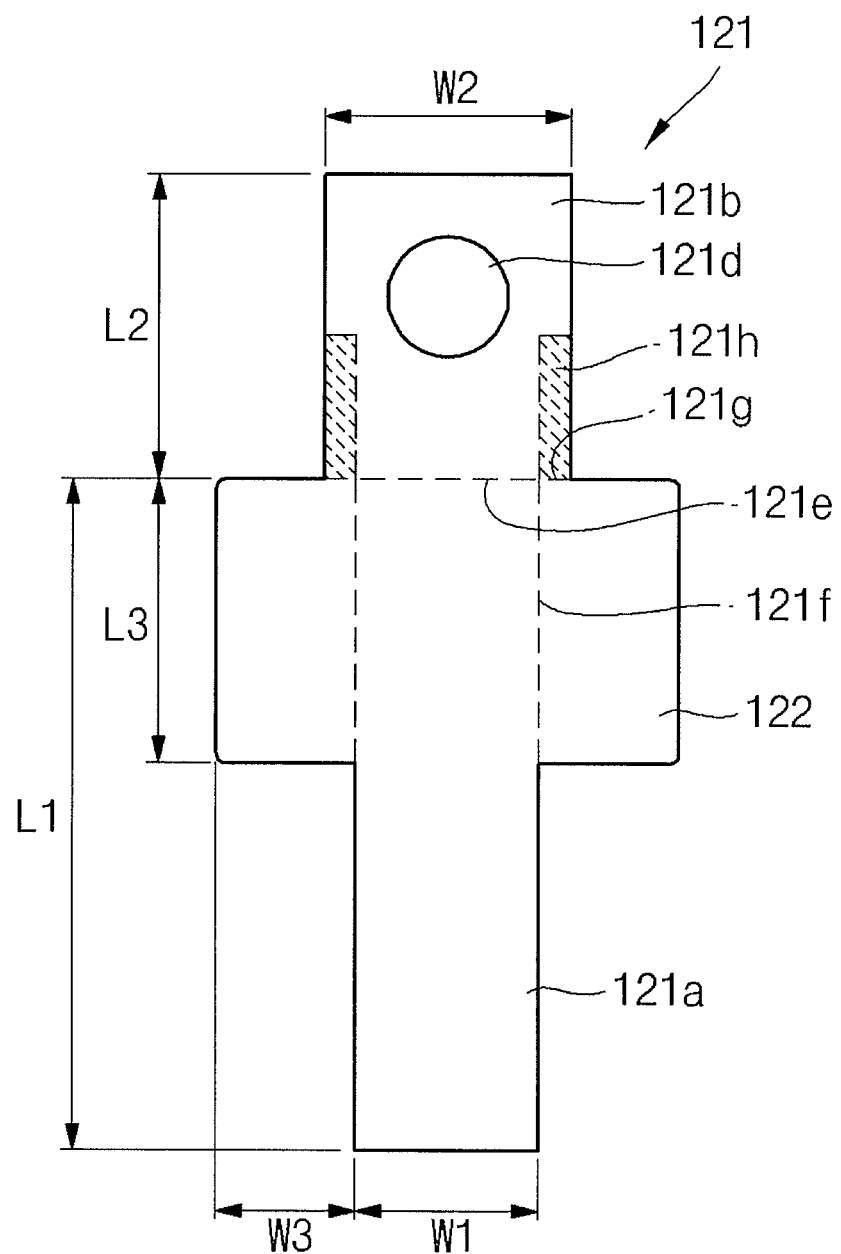

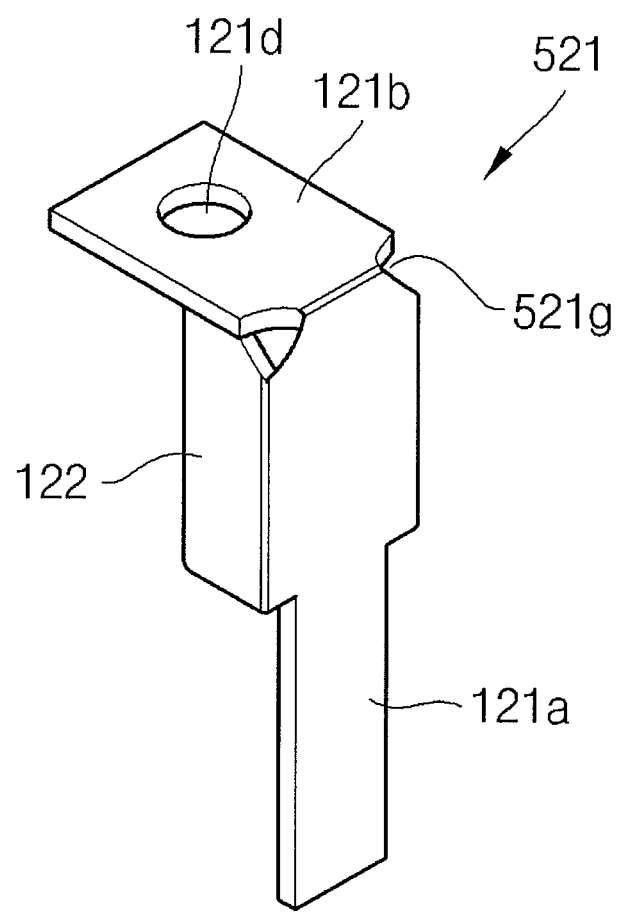

SECONDARY BATTERY

CROSS-REFERENCE TO RELATED APPLICATION

This application claims the benefit of U.S. Provisional Application No. 61/477,134, filed on Apr. 19, 2011, in the United States Patent and Trademark Office, the disclosure of which is incorporated herein in its entirety by reference.

TECHNICAL FIELD

Embodiments relate to a secondary battery.

BACKGROUND ART

Secondary batteries are rechargeable unlike primary batteries. Among such secondary batteries, a low capacity battery including a battery cell in the form of a pack may be used for small portable electronic devices such as cellular phones and camcorders, and a high capacity battery including dozens of battery cells connected to one another may be used as a motor-driving power source for electric scooters, hybrid vehicles, or electric vehicles.

Secondary batteries are manufactured in various shapes such as a cylindrical shape and a prismatic shape. A secondary battery is manufactured as follows: an electrode assembly formed by disposing an insulating separator between a positive electrode plate and a negative electrode plate is placed in a case together with electrolyte, and a cap plate is on the case. The electrode assembly is connected to positive and negative terminals which protrude from the cap plate and are exposed to the exterior of the electrode assembly.

SUMMARY

An aspect of the present invention provides a secondary battery having a terminal structure configured to withstand impact and vibration.

According to an embodiment of the present invention, a secondary battery is provided including an electrode assembly having a first electrode plate, a second electrode plate, and a separator between the first electrode plate and the second electrode plate; a first electrode terminal; a first collecting plate having a first region contacting the first electrode plate or the second electrode plate, a second region extending at an angle to the first region, and a first reinforcement part that extends substantially perpendicularly to both the first region and the second region; a case housing the electrode assembly and the first collecting plate; and a cap assembly sealing the case.

In one embodiment, the first reinforcement part, for example, an edge of the first reinforcement part, contacts the first region or the second region of the first collecting plate. Further, in embodiments, a width W2 of the second region is greater than a width W1 of the first region, a width W3 of the first reinforcement part is less than a length L2 of the second region or a length L3 of the first reinforcement part is less than a length L1 of the first region.

Additionally, in embodiments, a width of the first region is greater than a width of the second region, a width of the first reinforcement part is less than a length of the first region, and a length of the first reinforcement part is less than a length of the second region.

In one embodiment, the first collecting plate further comprises a second reinforcement part that is substantially opposite to the first reinforcement part. Further, the first collecting plate may be substantially symmetrical along a longitudinal axis thereof. In one embodiment, the first reinforcement part has a rounded corner and may be made from a single integral piece of material. Additionally, an edge between the first reinforcement part and the second region may be rounded and an edge between the first reinforcement part and the first region may be arc-shaped.

In embodiments, the first reinforcement part is integral with the first region and/or the second region. Additionally, the first region and the second region are planar and wherein the first region may be substantially perpendicular to the second region.

According to at least one of embodiments, a secondary battery includes a terminal part that is electrically connected to an electrode assembly disposed in a case and extends outward from the case. The terminal part includes: a collecting plate having a first region electrically connected to the electrode assembly and a second region bent from the first region; and an electrode terminal electrically connected to the collecting plate and extending outward from the case, wherein at least one reinforcement part is provided between the first and second regions of the collecting plate.

According to the embodiments, due to the at least one reinforcement part disposed between the first and second regions of the collecting plate, the bending stiffness and strength of the collecting plate can be improved. Particularly, the reinforcement part improves the bending stiffness and strength of the collecting plate in length and/or width directions. Therefore, although the secondary battery is impacted or vibrated in vertical and/or horizontal directions, the secondary battery may be used safely and reliably. For example, although the secondary battery is impacted or vibrated horizontally and/or vertically, the inside electrode assembly of the secondary battery may not be horizontally and/or vertically moved. Accordingly, an unnecessary electric short circuit may be prevented between the electrode assembly and the case, and thus the secondary battery may be used safely and reliably.

BRIEF DESCRIPTION OF THE DRAWINGS

FIGS. 2A and 2B are a perspective view and a development view illustrating a collecting plate of the secondary battery of FIG. 1A;

FIGS. 6A and 6B are a perspective view and a development view illustrating a collecting plate of a secondary battery according still yet to another embodiment;

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Hereinafter, embodiments will be described in detail with reference to the accompanying drawings.

Figure 1A:
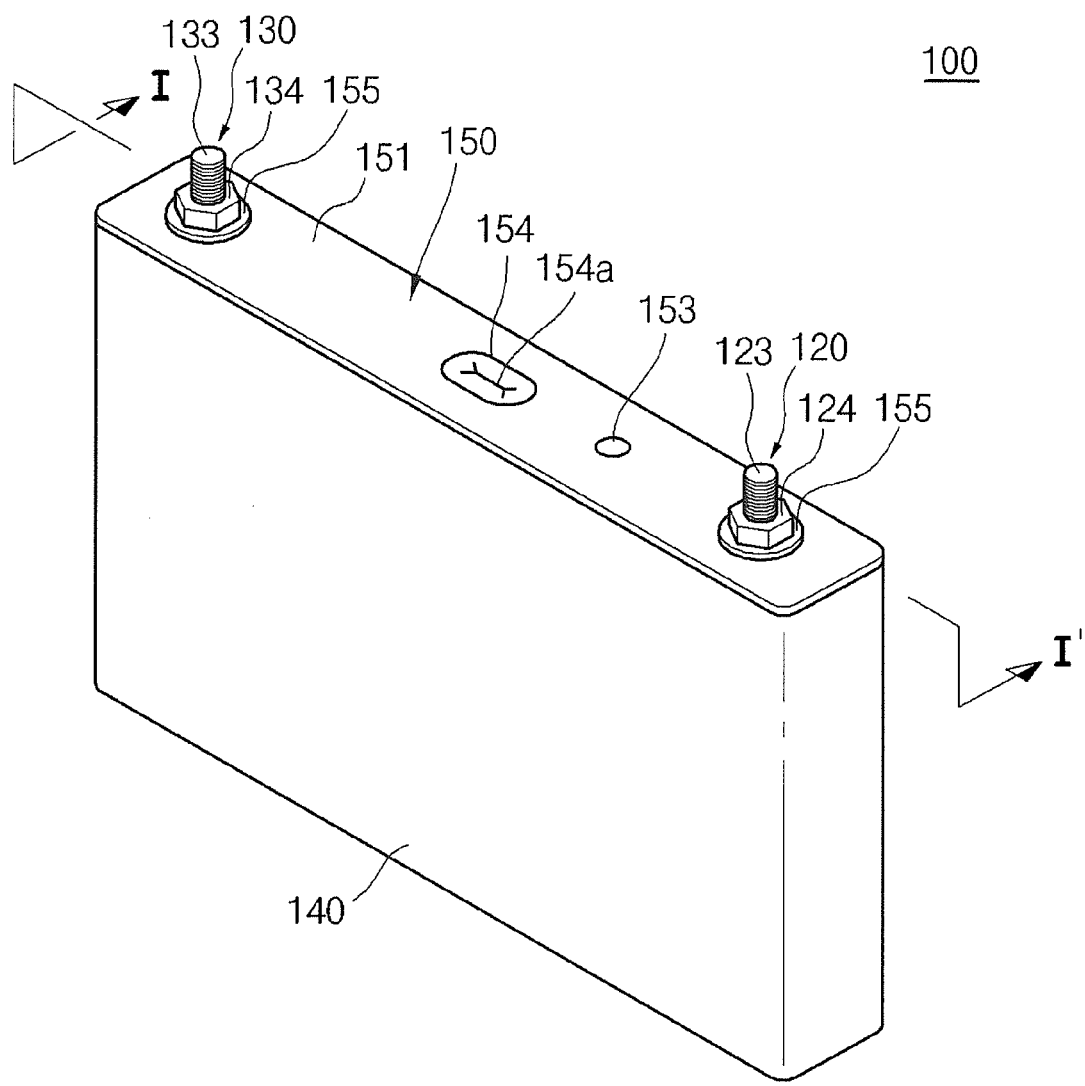
FIG. 1A is a perspective view illustrating a secondary battery according to an embodiment of the present invention.
Figure 1B:
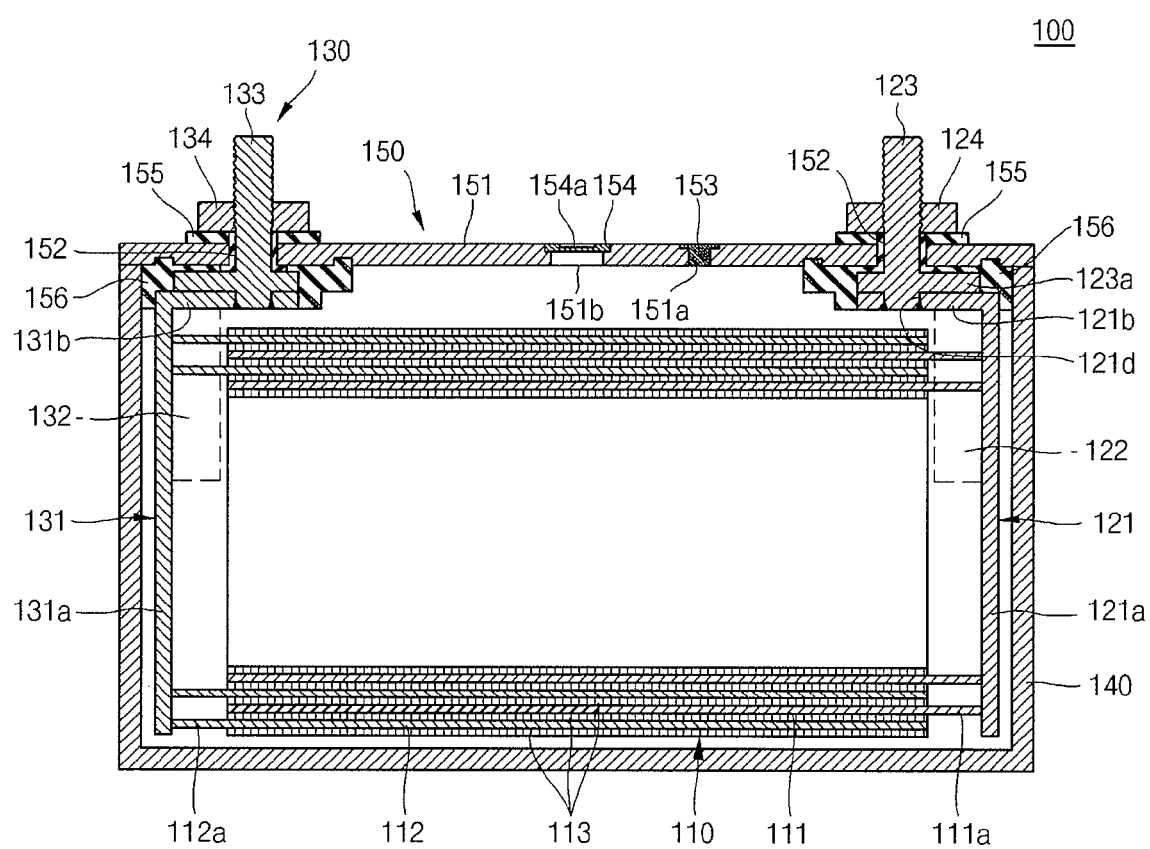
FIG. 1B is a sectional view taken along line I-I' of FIG. 1A.

FIG. 1A is a perspective view illustrating a secondary battery 100 according to an embodiment, and FIG. 1B is a sectional view taken along ling I-I' of FIG. 1A.

Referring to FIGS. 1A and 1B, the secondary battery 100 of the current embodiment includes an electrode assembly 110, a first terminal part 120, a second terminal part 130, a case 140, and a cap assembly 150.

The electrode assembly 110 is formed by winding or stacking a first electrode plate 111, a separator 113, and a second electrode plate 112 which have a thin plate or film shape. The first electrode plate 111 may function as a negative electrode, and the second electrode plate 112 may function as a positive electrode. Alternatively, the first electrode plate 111 and the second electrode plate 112 may function oppositely.

The first electrode plate 111 may be formed by applying a first electrode active material such as a transition metal oxide to a first electrode collector formed of metal foil such as aluminum foil. The first electrode plate 111 includes a first electrode non-coating portion 111a on which the first electrode active metal is not applied. The first electrode non-coating portion 111a functions as a current flow passage between the first electrode plate 111 and the outside of the first electrode plate 111. In the current embodiment, materials that can be used to form the first electrode plate 111 are not limited to the above-mentioned materials.

The second electrode plate 112 may be formed by applying a second electrode active material such as graphite or carbon to a second electrode collector formed of metal foil such as copper or nickel foil. The second electrode plate 112 includes a second electrode non-coating portion 112a on which the second electrode active metal is not applied. The second electrode non-coating portion 112a functions as a passage for a current between the second electrode plate 112 and the outside of the second electrode plate 112. In the current embodiment, materials that can be used to form the second electrode plate 112 are not limited to the above-mentioned materials.

The polarities of the first and second electrode plates 111 and 112 may be reversed with respect to each other.

The separator 113 may be between the first electrode plate 111 and the second electrode plate 112 to prevent a short circuit and allow movement of lithium ions. The separator 113 may be formed of a polyethylene film, a polypropylene film, or a film including polyethylene and polypropylene. In the current embodiment, materials that can be used to form the separator 113 are not limited to the above-mentioned materials.

The first and second terminal parts 120 and 130 are coupled to both end parts of the electrode assembly 110 in a manner such that the first and second terminal parts 120 and 130 are electrically connected to the first and second electrode plates 111 and 112, respectively.

Substantially, the electrode assembly 110 is accommodated in the case 140 together with electrolyte. The electrolyte may include an organic solvent such as ethylene carbonate (EC), propylene carbonate (PC), diethyl carbonate (DEC), ethyl methyl carbonate (EMC), and dimethyl carbonate (DMC); and a lithium salt such as $LiPF_6$ or $LiBF_4$. The electrolyte may be liquid, solid, or gel.

The first terminal part 120 is usually formed of a metal or an equivalent thereof, and is electrically connected to the first electrode plate 111. The first terminal part 120 includes a first collecting plate 121, a first electrode terminal 123, and a first coupling member 124.

The first collecting plate 121 makes contact with the first electrode non-coating portion 111a protruding from an end of the electrode assembly 110. Substantially, the first collecting plate 121 is welded to the first electrode non-coating portion 111a. The first collecting plate 121 has an approximately reverse L-shape, and a terminal hole 121d is formed in the upper portion of the first collecting plate 121. The first electrode terminal 123 is fitted and coupled to the terminal hole 121d. The first collecting plate 121 may be formed of aluminum or an aluminum alloy. However, the material of the first collecting plate 121 is not limited thereto.

In detail, the first collecting plate 121 includes a first region 121a, a second region 121b, and reinforcement parts 122. The first region 121a may be welded to the first electrode non-coating portion 111a of the electrode assembly 110. The first region 121a is approximately vertical in position (with respect to FIG. 1B). The second region 121b may be perpendicularly bent from the upper end of the first region 121a and may be approximately horizontal in position. The terminal hole 121d may be formed through the second region 121b so that the first electrode terminal 123 can be coupled to the terminal hole 121d. The reinforcement parts 122 are formed between the first region 121a and the second region 121b. The reinforcement parts 122 may be connected to or in contact with the first region 121a and the second region 121b.

Since the first collecting plate 121 includes the reinforcement parts 122, the bending stiffness of the first collecting plate 121 can be improved, and thus the first collecting plate 121 may be less bent when the first collecting plate 121 is horizontally or vertically impacted or vibrated. Therefore, although the secondary battery is horizontally and/or vertically impacted or vibrated, the electrode assembly 110 of the secondary battery may not be horizontally and/or vertically moved. Accordingly, an unnecessary electric short circuit may be prevented between the electrode assembly 110 and the case 140, and thus the secondary battery may be used safely and reliably. The structure of the first collecting plate 121 will be described later in more detail.

The first electrode terminal 123 penetrates a cap plate 151 (described later) and protrudes upwardly therefrom. The first electrode terminal 123 is electrically connected to the first collecting plate 121 at the lower side of the cap plate 151. The first electrode terminal 123 extends and protrudes upward from the cap plate 151, and the first electrode terminal 123 includes a laterally-extending flange 123a at a position under the cap plate 151 so that the first electrode terminal 123 cannot be separated from the cap plate 151. A part of the first electrode terminal 123 lower than the flange 123a may be inserted in the terminal hole 121d of the first collecting plate 121 and fixed to the terminal hole 121d by riveting or welding. A part of the first electrode terminal 123 higher than the flange 123a may be inserted through the cap plate 151 and protrude upwardly therefrom. The first coupling member 124 may be fixed to the protruding part of the first electrode terminal 123. A screw thread may be formed on the protruding part of the first electrode terminal 123 so that the first coupling member 124 can be screw-coupled to the protruding part of the first electrode terminal 123. The first electrode terminal 123 may be electrically insulated from the cap plate 151. For example, the first electrode terminal 123 may be formed of one of aluminum, aluminum alloy, and an equivalent thereof. However, materials that can be used to form the first electrode terminal 123 are not limited thereto.

The first coupling member 124 may have a hexagonal nut shape, and a vertical penetration hole may be formed through the center of the first coupling member 124 so that the first electrode terminal 123 can be inserted through and coupled with the first coupling member 124. The first coupling member 124 may be formed of one of stainless steel, aluminum, aluminum alloy, copper, copper alloy, and an equivalent thereof. However, materials that can be used to form the first coupling member 124 are not limited thereto. The first coupling member 124 and the cap plate 151 may be insulated from each other.

The second terminal part 130 is usually formed of a metal or an equivalent thereof, and is electrically connected to the second electrode plate 112. The second terminal part 130 includes a second collecting plate 131, a second electrode terminal 133, and a second coupling member 134. The second terminal part 130 may have the same shape as that of the first terminal part 120. Thus, a detailed description thereof will not be repeated.

The second collecting plate 131 includes a first region 131a, a second region 131b, and reinforcement parts 132. The first region 131a may be welded to the second electrode non-coating portion 112a of the electrode assembly 110. The first region 131a is approximately vertical in position. The second region 131b may be perpendicularly bent from the upper end of the first region 131 such that it is approximately horizontal in position. The reinforcement parts 132 are formed between the first region 131a and the second region 131b. The reinforcement parts 132 may be connected to or in contact with the first region 131a and/or the second region 131b. The second collecting plate 131 may have substantially the same structure as that of the first collecting plate 121.

The second collecting plate 131 and the second electrode terminal 133 may be formed of one of copper, a copper alloy, and an equivalent thereof. However, materials that can be used to form the second collecting plate 131 and the second electrode terminal 133 are not limited to such materials. The second coupling member 134 may be formed of one of stainless steel, aluminum, aluminum alloy, copper, copper alloy, and an equivalent thereof. However, materials that can be used to form the second coupling member 134 are not limited thereto.

The case 140 is formed of a conductive metal such as aluminum, aluminum alloy, or steel plated with nickel. The case 140 has an approximately hexahedral shape with an opening so that the electrode assembly 110, the first terminal part 120, and the second terminal part 130 can be inserted and placed in the case 140. FIG. 1B illustrates a state where the case 140 and the cap assembly 150 are coupled to each other, and the opening of the case 140 is not shown. However, the peripheral part of the cap assembly 150 substantially corresponds to the opening of the case 140. The inner surface of the case 140 may be treated to be electrically insulated from the electrode assembly 110, the first terminal part 120, the second terminal part 130, and the cap assembly 150.

The cap assembly 150 is coupled to the case 140. In detail, the cap assembly 150 includes the cap plate 151, sealing gaskets 152, a plug 153, a safety vent 154, upper insulation members 155, and lower insulation members 156. Alternatively, the sealing gaskets 152, the upper insulation members 155, and the lower insulation members 156 may be considered as elements of the first and second terminal parts 120 and 130.

The cap plate 151 closes the opening of the case 140. The cap plate 151 may be formed of the same material as the case 140. For example, the cap plate 151 may be coupled to the case 140 by laser welding. If the cap plate 151 is electrically connected to the first terminal part 120, the cap plate 151 may have the same polarity as that of the first terminal part 120. In addition, the cap plate 151 and the case 140 may have the same polarity.

The sealing gaskets 152 are formed of an insulating material and are between the cap plate 151 and the first and second electrode terminals 123 and 133 to seal gaps between the cap plate 151 and the first and second electrode terminals 123 and 133. The sealing gaskets 152 prevent permeation of moisture into the secondary battery 100 or leakage of electrolyte from the inside of the secondary battery 100.

The plug 153 closes an electrolyte injection hole 151a of the cap plate 151. The safety vent 154 is in a vent hole 151b of the cap plate 151, and a notch 154a is formed in the safety vent 154 so that the safety vent 154 can be opened at a preset pressure.

The upper insulation members 155 are disposed between the cap plate 151 and the first and second coupling members 124 and 134. In addition, the upper insulation members 155 make tight contact with the cap plate 151. Furthermore, the upper insulation members 155 may make tight contact with the sealing gaskets 152. The upper insulation members 155 insulate the cap plate 151 from the first and second coupling members 124 and 134.

The lower insulation members 156 are located between the cap plate 151 and the first and second collecting plates 121 and 131 to prevent an unnecessary short circuit. That is, the lower insulation members 156 prevent a short circuit between the first collecting plate 121 and the cap plate 151 and a short circuit between the second collecting plate 131 and the cap plate 151. In addition, the lower insulation members 156 are also located between the cap plate 151 and the first and second electrode terminals 123 and 133 so that a short circuit can be prevented between the cap plate 151 and the first and second electrode terminals 123 and 133.

Figure 2A:
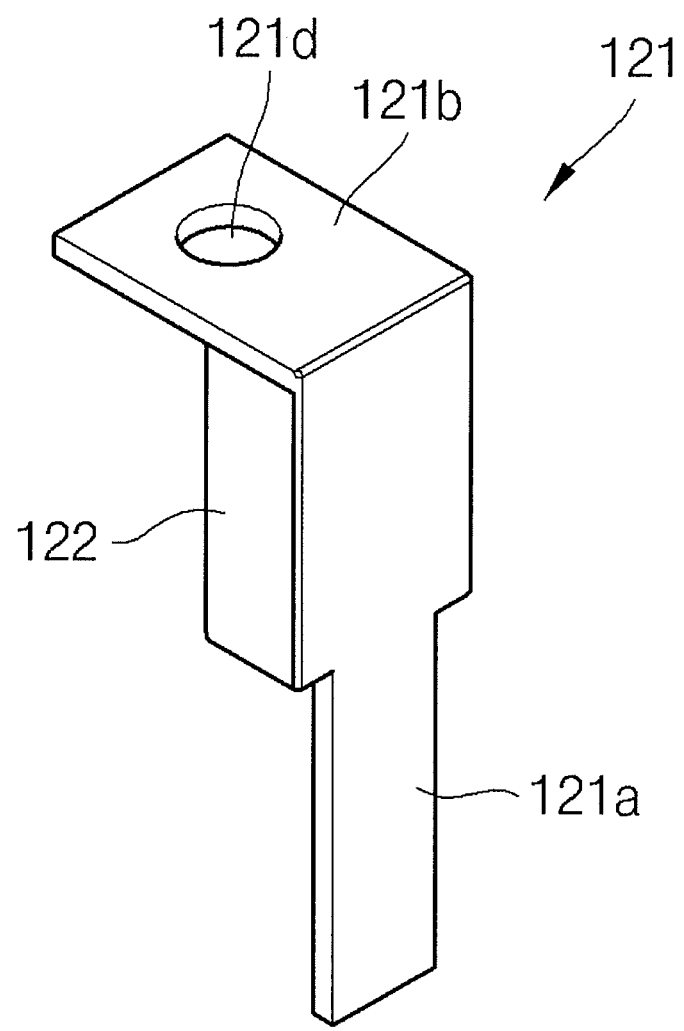

FIGS. 2A and 2B are a perspective view and a development view illustrating the collecting plate 121 of the secondary battery of the embodiment.

As shown in FIGS. 2A and 2B, the collecting plate 121 includes the first region 121a, the second region 121b, and the reinforcement parts 122. The first and second regions 121a and 121b are bent from each other at about a right angle. The terminal hole 121d may be formed through the second region 121b so that the first electrode terminal 123 can be coupled to the terminal hole 121d. The reinforcement parts 122 extend from both sides of the first region 121a and are bent at about a right angle from the first region 121a.

Referring to FIG. 2B, reference numerals 121e, 121f, and 121g denote bending and cutting lines. In detail, reference numeral 121e denotes a bending line between the first region 121a and the second region 121b. The first region 121a and the second region 121b are bent at the bending line 121e so that the first region 121a and the second region 121b can make approximately a right angle with each other. Reference numeral 121f denotes bending lines between the first region 121a and the reinforcement parts 122. The reinforcement parts 122 are bent from the first region 121a at the bending lines 121f so that the reinforcement parts 122 can make approximately a right angle with the first region 121a. Reference numeral 121g denotes cutting lines between the second region 121b and the reinforcement parts 122. Due to the cutting lines 121g, the reinforcement parts 122 may be easily bent toward a region under the second region 121b.

Referring to FIG. 2B, reference numeral 121h denotes regions of the second region 121b. The reinforcement parts 122 are brought into contact with the bottom sides of the regions 121h of the second region 121b. In other words, after bending the first and second regions 121a and 121b at approximately a right angle, the reinforcement parts 122 are bent from the first region 121a at approximately a right angle. Then, the top surfaces of the reinforcement parts 122 make contact with the bottom surface of the second region 121b. In one embodiment, a width W2 of the second region 121b is greater than a width W1 of the first region 121a. In another example, the reinforcement parts 122 may be bent from the first region 121a at approximately a right angle, and then the first and second regions 121a and 121b may be bent at approximately a right angle. The result is the same as above. In other words, the top surfaces of the reinforcement parts 122 make contact with the bottom surface of the second region 121b.

As described above, the reinforcement parts 122 are located between the first and second regions 121a and 121b as connection or contact parts. Therefore, the bending strength of the collecting plate 121 can be improved. The contact regions between second region 121b and the reinforcement parts 122 may be treated by welding or soldering to further improve the bending strength of the collecting plate 121.

If the width W2 of the second region 121b is equal to or less than the width W1 of the first region 121a, the reinforcement parts 122 may have to be bent at an acute angle for making contact with the second region 121b. However, this makes it difficult to fabricate the collecting plate 121, and other parts may be damaged due to a protruded shape of a bent region.

The reinforcement parts 122 may be made as wide as possible. As the reinforcement parts 122 have a larger width W3, larger regions of the reinforcement parts 122 may make contact with the second region 121b. However, the width W3 of the reinforcement parts 122 is less than a length L2 of the second region 121b for preventing an electric short circuit with another part. The width W3 of the reinforcement parts 122 may be about 1% to about 99% of the length L2 of the second region 121b. For example, the width W3 of the reinforcement parts 122 may be about 10% to about 90% of the length L2 of the second region 121b. In another example, the width W3 of the reinforcement parts 122 may be about 30% to about 70% of the length L2 of the second region 121b.

The reinforcement parts 122 may be made as long as possible. As a length L3 of the reinforcement parts 122 increases, larger regions of the reinforcement parts 122 may be connected to the first region 121a. However, the length L3 of the reinforcement parts 122 is less than a length L1 of the first region 121a for preventing an electric short circuit with another part. The length L3 of the reinforcement parts 122 may be about 1% to about 99% of the length L1 of the first region 121a. For example, the length L3 of the rein-forcement parts 122 may be about 10% to about 90% of the length L1 of the first region 121a. In another example, the length L3 of the reinforcement parts 122 may be about 30% to about 70% of the length L1 of the first region 121a.

Figure 3:
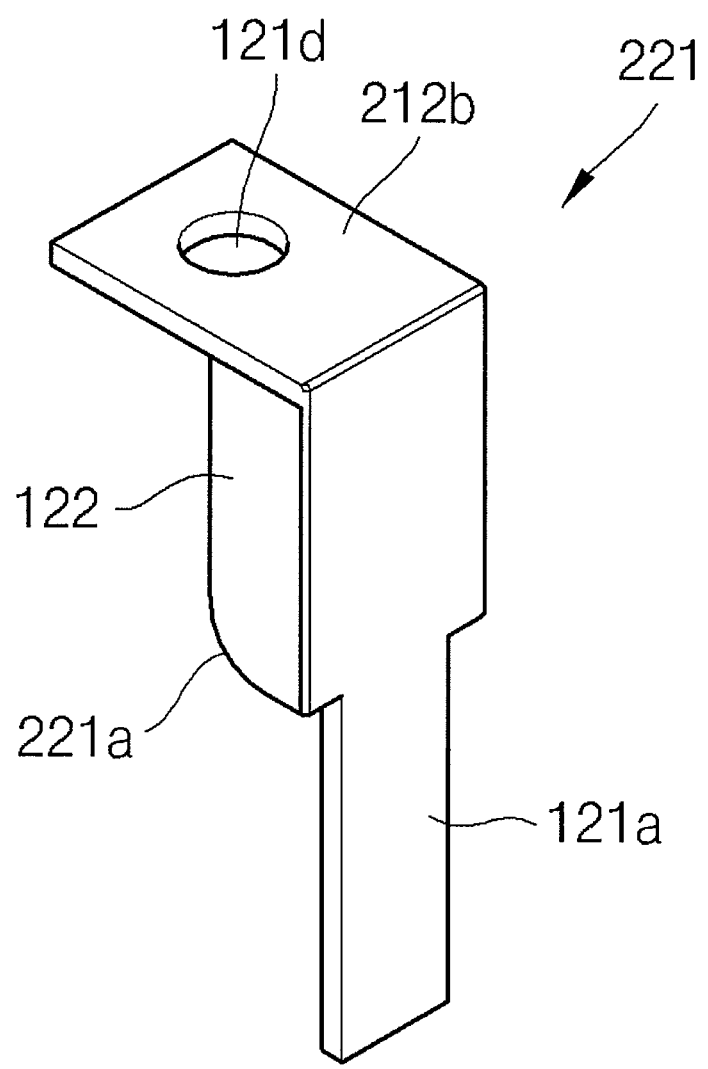
FIG. 3 is a sectional view illustrating a collecting plate of a secondary battery according to another embodiment.

FIG. 3 is a sectional view illustrating a collecting plate 221 of a secondary battery according to another embodiment.

As shown in FIG. 3, the collecting plate 221 may include rounded reinforcement parts 122. In detail, round parts 221a may be formed on lower corners of the reinforcement parts 122 located between first and second regions 121a and 121b. The reinforcement parts 122 are bent from both sides of the first region 121a, and an electrode assembly is assembled between the reinforcement parts 122. If the lower corners of the reinforcement parts 122 are sharply right-angled, the electrode assembly may be damaged while being inserted between the reinforcement parts 122. However, as shown in FIG. 3, since the round parts 221a are formed on the lower corners of the reinforcement parts 122, the electrode assembly may not be damaged during assembling. The radius of the round parts 221a is not limited so long as the electrode assembly is not damaged. Instead of the round parts 221a, chamfer parts may be formed.

Figure 4A:
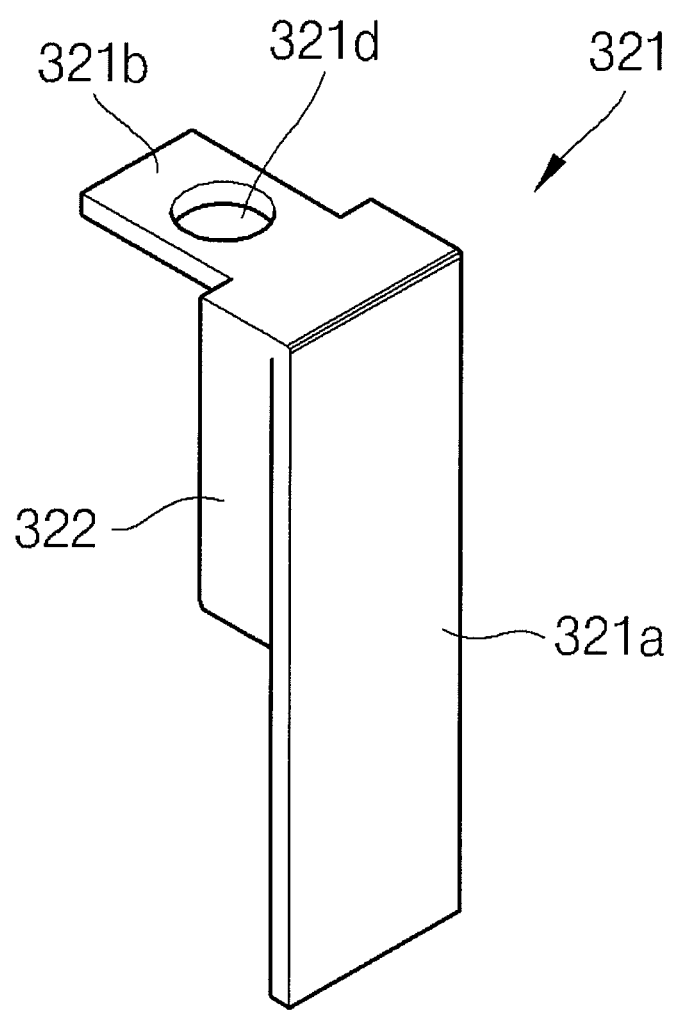
FIGS. 4A and 4B are a perspective view and a development view illustrating a collecting plate of a secondary battery according to yet another embodiment.
Figure 4B:
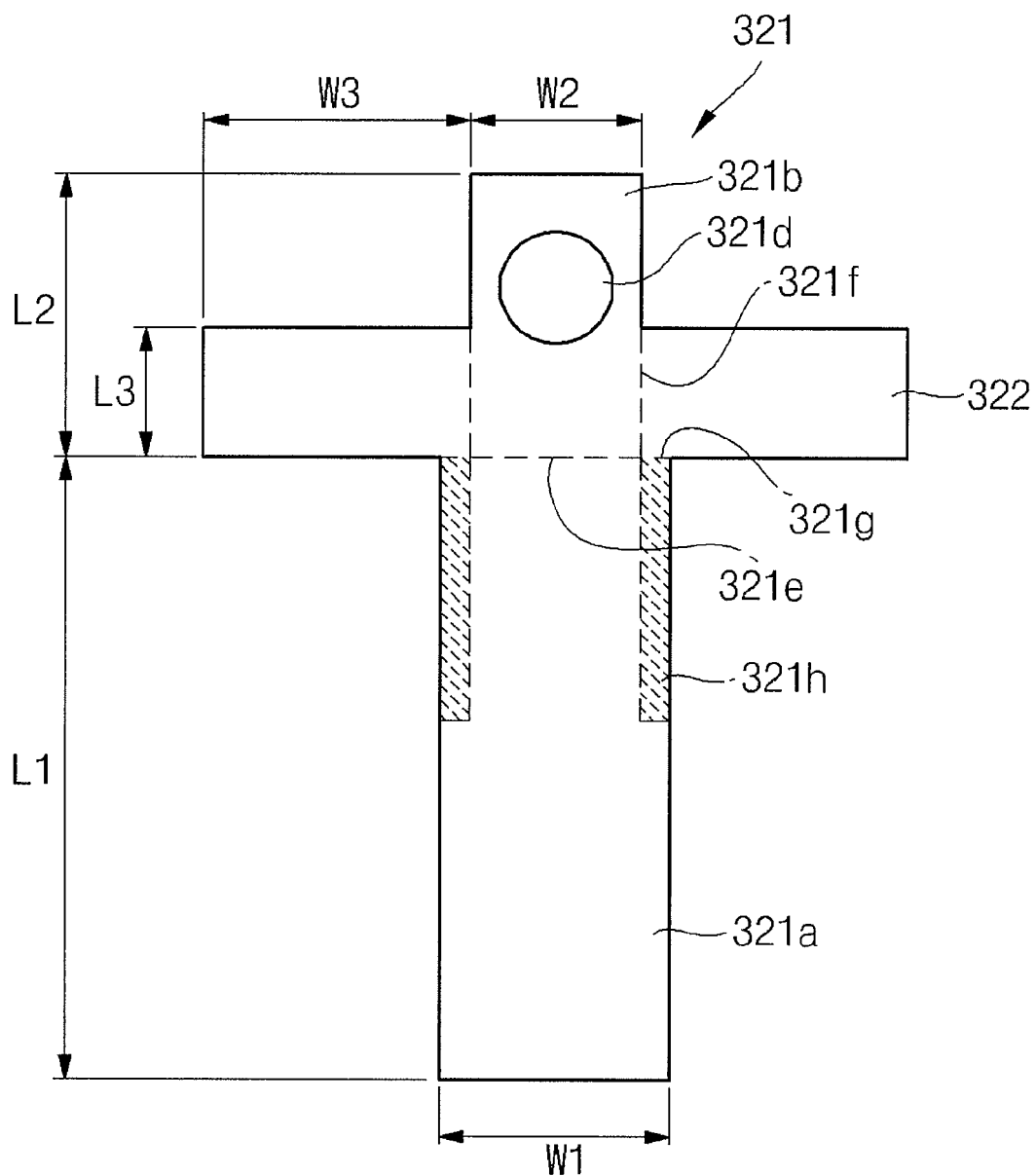

FIGS. 4A and 4B are a perspective view and a development view illustrating a collecting plate 321 of a secondary battery of another embodiment.

As shown in FIGS. 4A and 4B, the collecting plate 321 includes a first region 321a, a second region 321b, and reinforcement parts 322. The reinforcement parts 322 extend from both sides of the second region 321b and are bent at about right angle from the second region 321b.

Referring to FIG. 4B, reference numerals 321e, 321f, and 321g denote bending and cutting lines. In detail, reference numeral 321e denotes a bending line between the first region 321a and the second region 321b. The first region 321a and the second region 321b are bent at the bending line 321e so that the first region 321a and the second region 321b can make approximately a right angle with each other. Reference numeral 321f denotes bending lines between the second region 321b and the reinforcement parts 322. The reinforcement parts 322 are bent from the second regions 321b at the bending lines 321f so that the reinforcement parts 322 can make approximately a right angle with the second region 321b. Reference numeral 321g denotes cutting lines between the first region 321a and the reinforcement parts 322. Due to the cutting lines 321g, the reinforcement parts 322 may be easily bent toward a rear surface of the first region 321a.

Referring to FIG. 4B, reference numeral 321h denotes regions of the first region 321a. The reinforcement parts 322 are brought into contact with the rear surfaces of the regions 321h of the first region 321a. In other words, the reinforcement parts 322 are bent from the second region 321b at approximately right angle, and front surfaces of the reinforcement parts 322 are in contact with the rear surface of the first region 321a. In one embodiment, a width W1 of the first region 321a is greater than a width W2 of the second region 321b.

As described above, the reinforcement parts 322 are located between the first and second regions 321a and 321b as a connection part. Therefore, the bending strength of the collecting plate 321 can be improved. The contact regions between the first region 321a and the reinforcement parts 322 may be treated by welding or soldering to further improve the bending strength of the collecting plate 321.

If the width W1 of the first region 321a is equal to or less than the width W2 of the second region 321b, the reinforcement parts 322 may have to be bent at an acute angle for making contact with the first region 321a. However, this makes it difficult to fabricate the collecting plate 321, and other parts may be damaged due to a protruded shape of a bent region.

The reinforcement parts 322 may be made as wide as possible. As a width W3 of the reinforcements part 322 increases, larger regions of the reinforcement parts 322 may make contact with the first region 321a. However, the width W3 of the reinforcement parts 322 is less than the length L1 of the first region 321a for preventing an electric short circuit with another part. The width W3 of the reinforcement parts 322 may be about 1% to about 99% of the length L1 of the first region 321a. For example, the width W3 of the reinforcement parts 322 may be about 10% to about 90% of the length L1 of the first region 321a. In another example, the width W3 of the reinforcement parts 322 may be about 30% to about 70% of the length L1 of the first region 321a.

The reinforcement parts 322 may be made as long as possible. As a length L3 of the reinforcement parts 322 increases, larger regions of the reinforcement parts 322 may be connected to the second region 321b. However, the length L3 of the reinforcement parts 322 is less than a length L2 of the second region 321b for preventing an electric short circuit with another part. The length L3 of the reinforcement parts 322 may be about 1% to about 99% of the length L2 of the second region 321b. For example, the length L3 of the reinforcement parts 322 may be about 10% to about 90% of the length L2 of the second region 321b. In another example, the length L3 of the reinforcement parts 322 may be about 30% to about 70% of the length L2 of the second region 321b.

Figure 5:
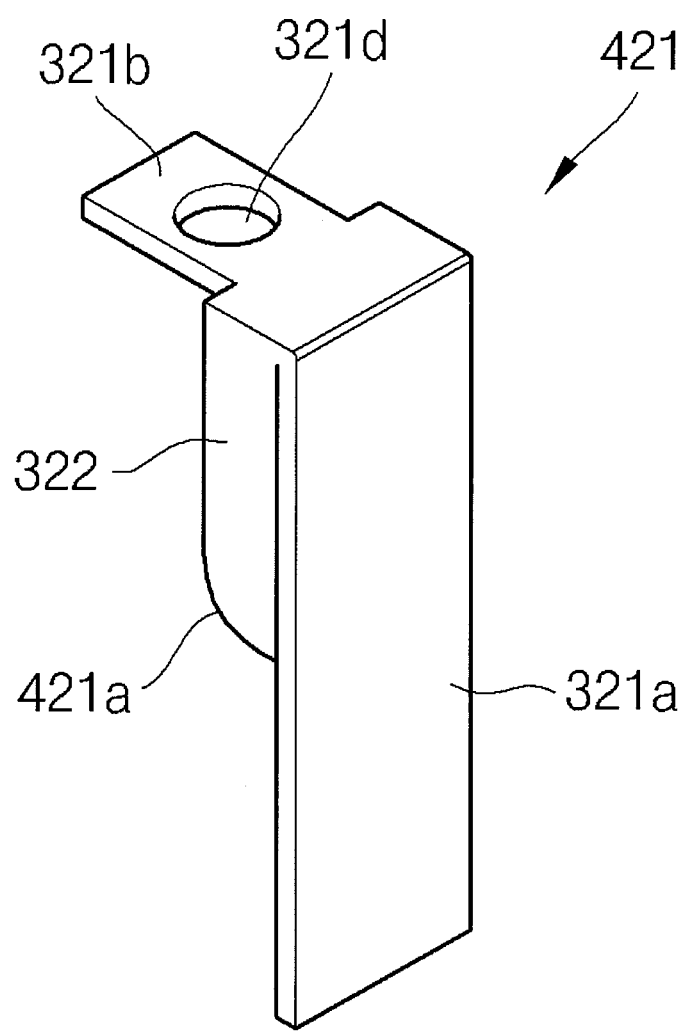
FIG. 5 is a sectional view illustrating a collecting plate of a secondary battery according to still another embodiment.

FIG. 5 is a sectional view illustrating a collecting plate 421 of a secondary battery according to another embodiment.

As shown in FIG. 5, the collecting plate 421 may include rounded reinforcement parts 322. In detail, round parts 421a may be formed on lower corners of the reinforcement parts 322 disposed between first and second regions 321a and 321b. The radius of the round parts 421a is not limited so long as an electrode assembly is not damaged. Instead of the round parts 421a, chamfer parts may be formed.

Figure 6B:
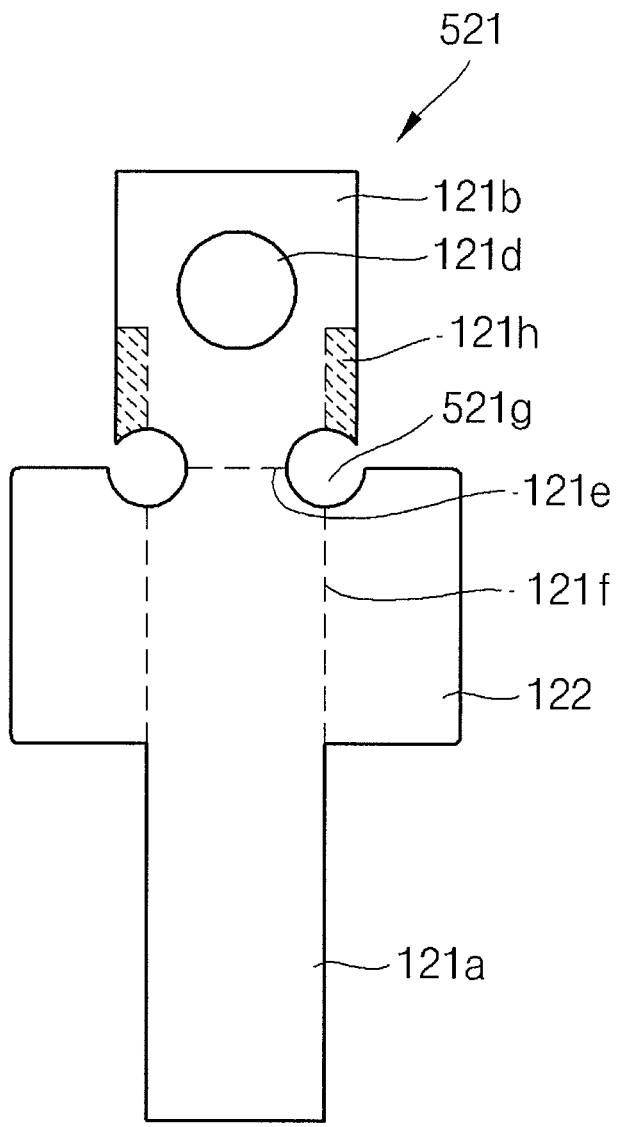

FIGS. 6A and 6B are a perspective view and a development view illustrating a collecting plate 521 of a secondary battery according to another embodiment.

As shown in FIGS. 6A and 6B, the collecting plate 521 includes a first region 121a, a second region 121b, and reinforcement parts 122. Substantially, the reinforcement parts 122 extend from the first region 121a.

Cut holes 521g are formed in boundary regions among the first region 121a, the second region 121b, and the reinforcement parts 122. Due to the cut holes 521g, the width of the boundary regions is relatively reduced, and thus second region 121b may be easily bent from the first region 121a. In other words, the first region 121a may be easily bent from the second region 121b.

Referring to FIG. 6B, the cut holes 521g have an approximately circular shape. However, the shape of the cut holes 521g is not limited thereto. For example, the cut holes 521g may have other shapes such as triangular and rectangular shapes. Referring to FIG. 6A, the cut holes 521g has an approximately triangular shape after the first and second regions 121a and 121b and the reinforcement parts 122 are bent. However, the cut holes 521g may be deformed in other shapes after the first and second regions 121a and 121b and the reinforcement parts 122 are bent.

Other structures of the collecting plate 521 are equal to those of the collecting plate 121 described with reference to FIGS. 2A and 2B. Thus, descriptions thereof will not be repeated.

Figure 7:
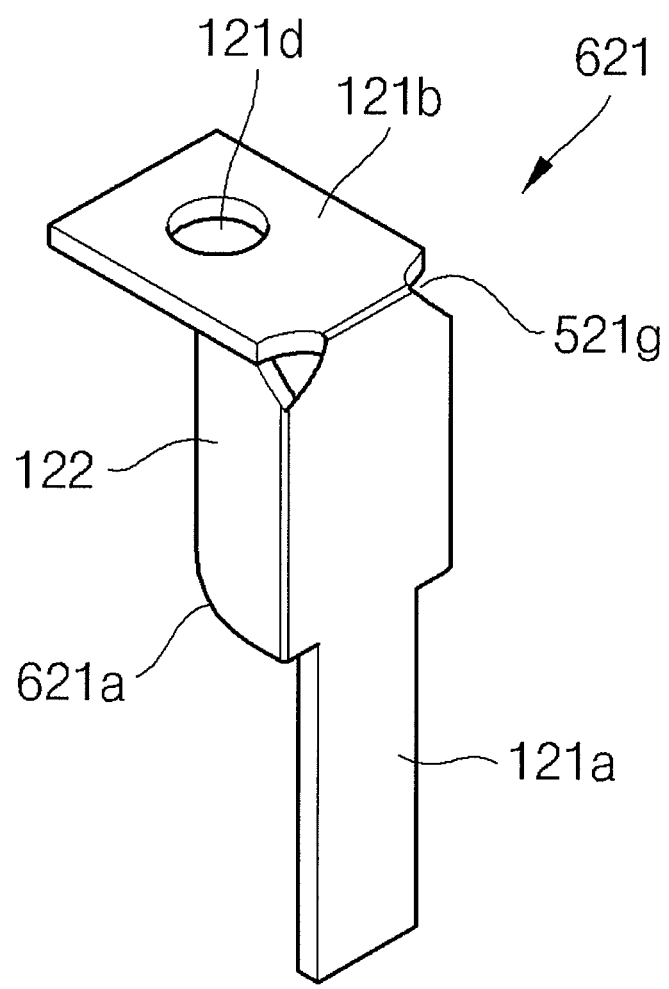
FIG. 7 is a sectional view illustrating a collecting plate of a secondary battery according to yet another embodiment.

FIG. 7 is a sectional view illustrating a collecting plate 621 of a secondary battery according to another embodiment.

As shown in FIG. 7, the collecting plate 621 may include rounded reinforcement parts 122. In detail, round parts 621a may be formed on lower corners of the reinforcement parts 122 disposed between first and second regions 121a and 121b. Instead of the round parts 621a, chamfer parts may be formed.

Other structures of the collecting plate 621 are equal to those of the collecting plate 521 described with reference to FIGS. 6A and 6B. Thus, descriptions thereof will not be repeated.

Figure 8A:
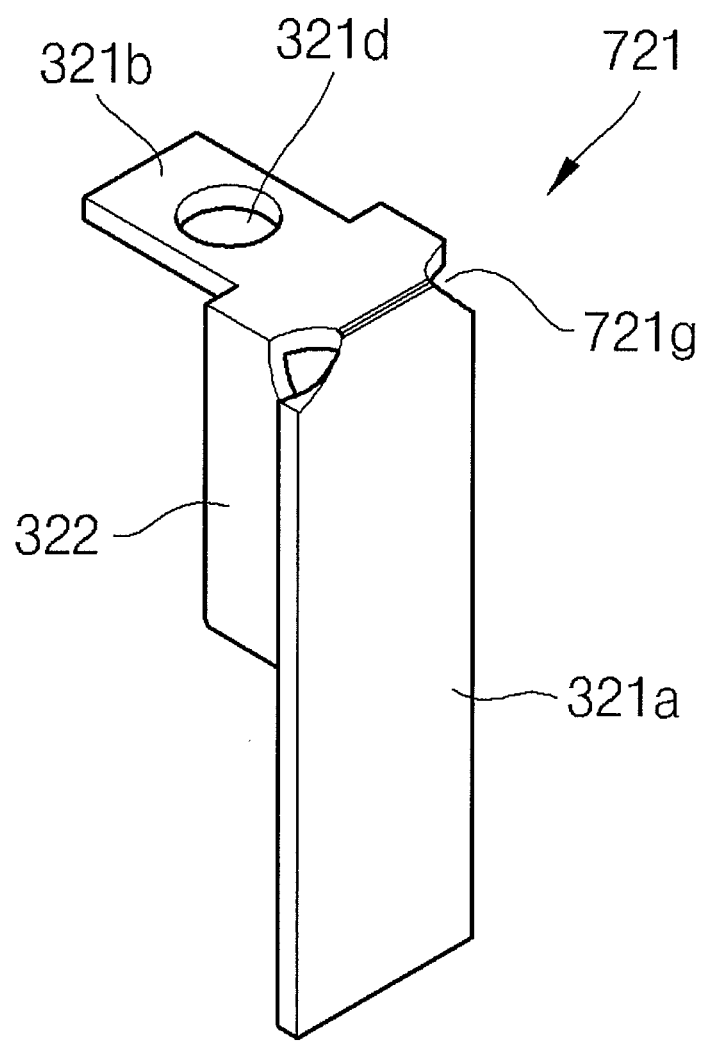
FIGS. 8A and 8B are a perspective view and a development view illustrating a collecting plate of a secondary battery according to still another embodiment.
Figure 8B:
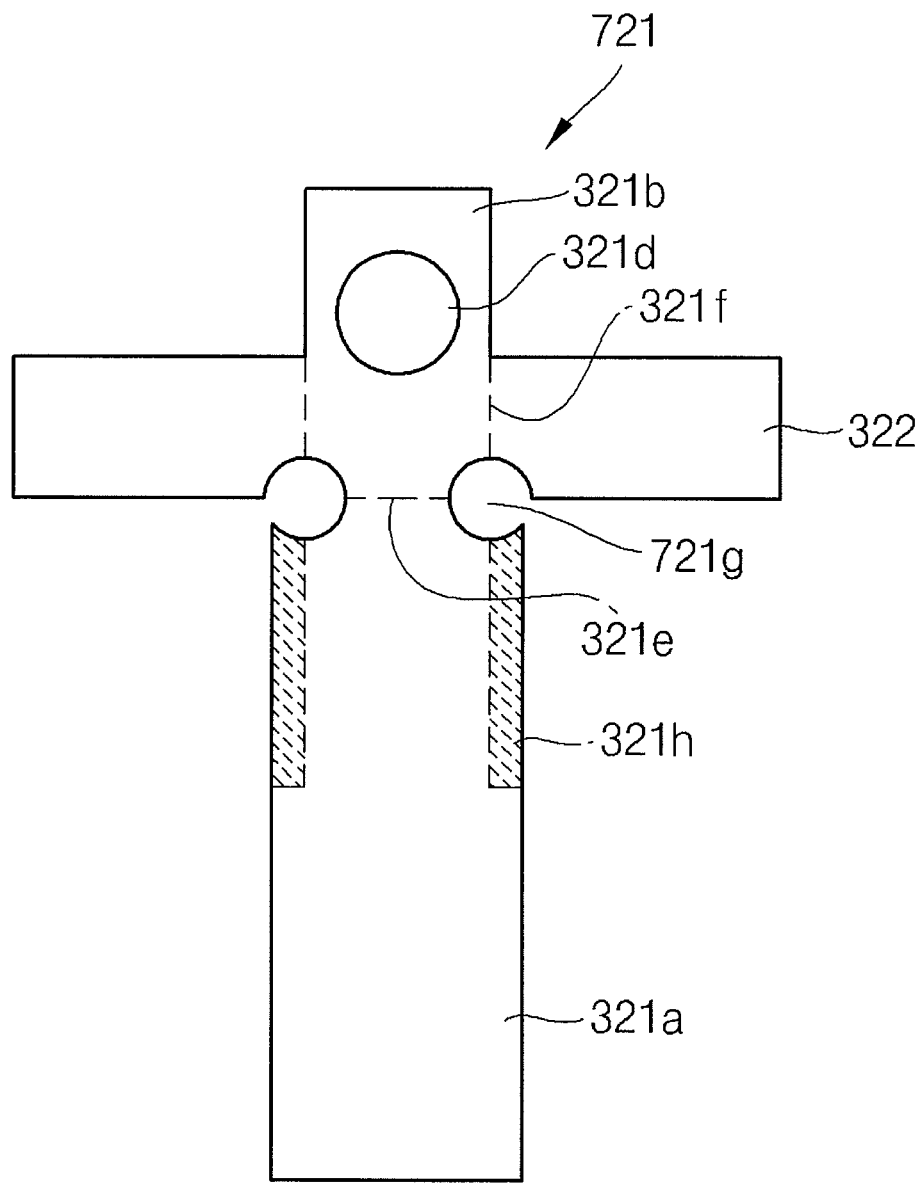

FIGS. 8A and 8B are a perspective view and a development view illustrating a collecting plate 721 of a secondary battery according to another embodiment.

As shown in FIGS. 8A and 8B, the collecting plate 721 includes a first region 321a, a second region 321b, and reinforcement part 322. Substantially, the reinforcement parts 322 extend from the second region 321b.

Cut holes 721g are formed in boundary regions among the first region 321a, the second region 321b, and the reinforcement parts 322. Due to the cut holes 721g, the width of the boundary regions is relatively reduced, and thus second region 321b may be easily bent from the first region 321a. In other words, the first region 321a may be easily bent from the second region 321b.

Other structures of the collecting plate 721 are equal to those of the collecting plate 321 described with reference to FIGS. 4A and 4B. Thus, descriptions thereof will not be repeated.

Figure 9:
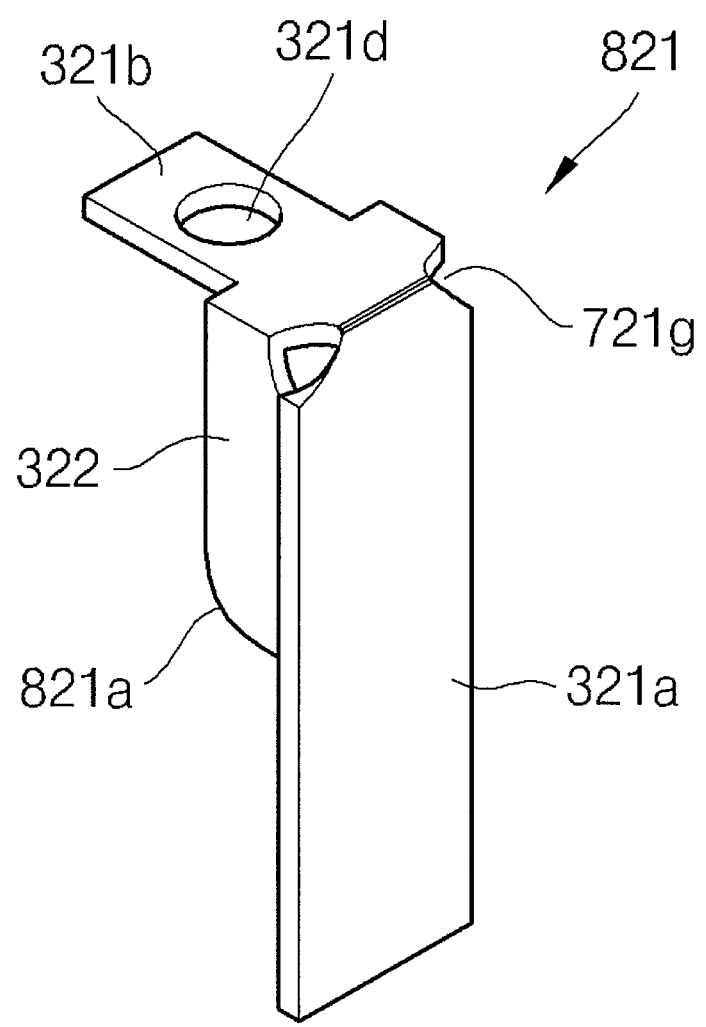
FIG. 9 is a sectional view illustrating a collecting plate of a secondary battery according to yet another embodiment.

FIG. 9 is a sectional view illustrating a collecting plate 821 of a secondary battery according to another embodiment.

As shown in FIG. 9, the collecting plate 821 may include rounded reinforcement parts 322. In detail, round parts 821a may be formed on lower corners of the reinforcement parts 322 disposed between first and second regions 321a and 321b. Instead of the round parts 821a, chamfer parts may be formed.

Other structures of the collecting plate 821 are equal to those of the collecting plate 721 described with reference to FIGS. 8A and 8B. Thus, descriptions thereof will not be repeated.

Figure 10:
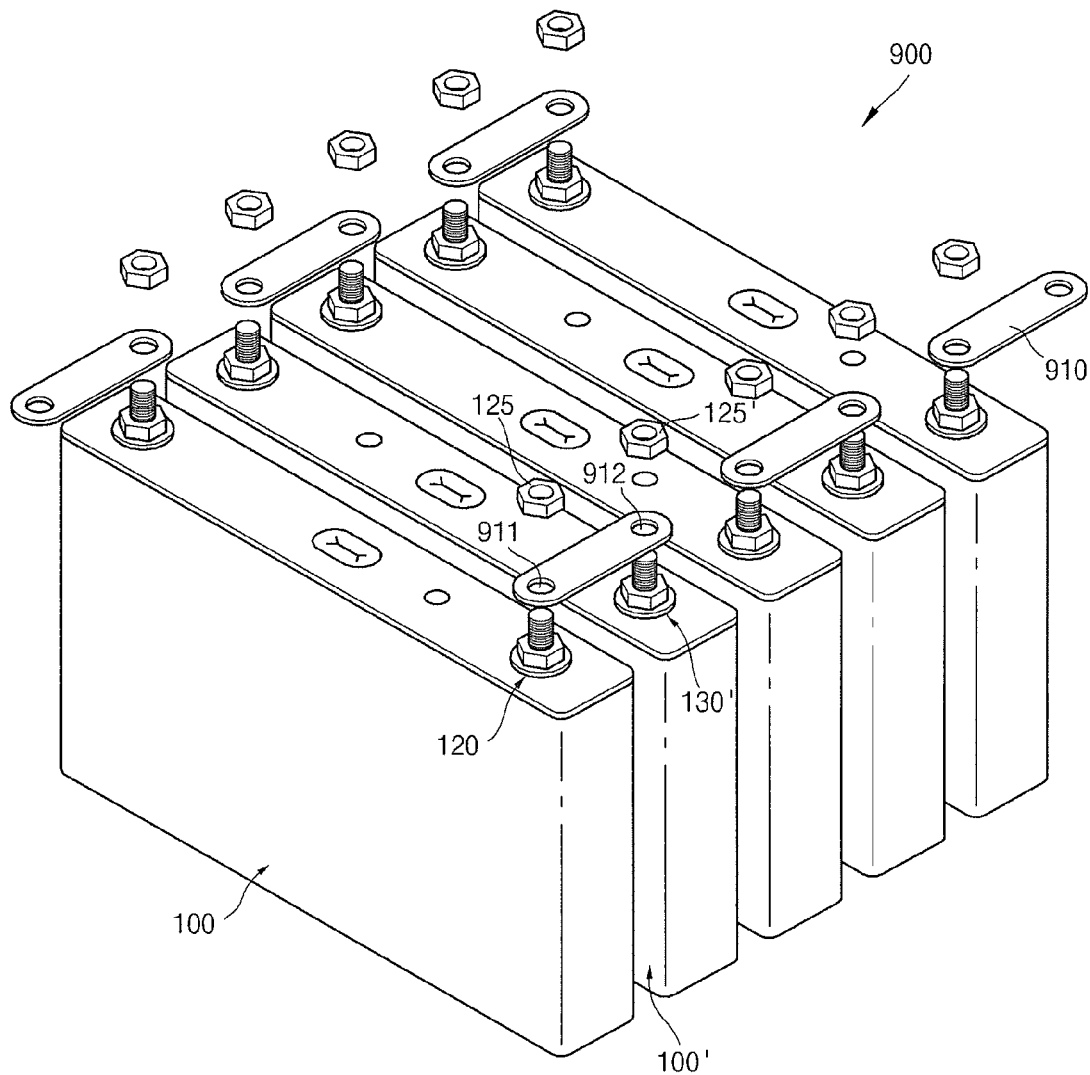
FIG. 10 is perspective view illustrating an exemplary battery pack including secondary batteries according to an embodiment.

FIG. 10 is perspective view illustrating an exemplary battery pack 900 including secondary batteries according to an embodiment.

As shown in FIG. 10, the battery pack 900 includes a plurality of secondary batteries 100 and 100' and a plurality of bus bars 910. The secondary batteries 100 and 100' may be horizontal arranged, and the bus bars 910 may be connected in a manner such that a first terminal part 120 of a secondary battery 100 is connected to a second terminal part 130' of a neighboring secondary battery 100'. For example, a first terminal part 120 is coupled to a penetration 911 of a bus bar 910, and a second terminal part 130' is coupled to another penetration hole 912 of the bus bar 910. The bus bar 910 can be brought into tight contact with the first and second terminal parts 120 and 130' by tightening the first and second terminal parts 120 and 130' protruding from the bus bar 910 with coupling members 125 and 125'.

Exemplary embodiments of a secondary battery have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

| [REFERENCE NUMERAL] | |
|---|---|
| 100: secondary battery | 110: electrode assembly |
| 120: first terminal part | 121: first collecting plate |
| 121a: first region | 121b: second region |
| 122: reinforcement part | 123: first electrode terminal |
| 124: first coupling member | 130: second terminal part |
| 131: second collecting plate | 133: second electrode terminal |
| 134: second coupling member | 140: case |
| 150: cap assembly | 151: cap plate |
| 152: seal gasket | 153: plug |
| 154: safety vent | 155: upper insulation member |
| 156: lower insulation member | |

What is claimed is:

1. A secondary battery comprising:
an electrode assembly comprising a first electrode plate, a second electrode plate, and a separator between the first electrode plate and the second electrode plate;
a first electrode terminal;
a first collecting plate having a flat and rectangular first region contacting the first electrode plate or the second electrode plate, a second region extending perpendicular to and directly contacting the first region, wherein the second region has a terminal hole configured to receive the first electrode terminal, and a first reinforcement part and a second reinforcement part that extend perpendicular to and directly and electrically contact and support both the first region and the second region, wherein a width (W2) of the second region is greater than a width (W1) of the first region, and a length (L3) of the first reinforcement part is less than a length (L1) of the first region;
a case housing the electrode assembly and the first collecting plate; and a cap assembly sealing the case.

2. The secondary battery of claim 1, wherein an edge of the first reinforcement part contacts the second region of the first collecting plate.

3. The secondary battery of claim 1, wherein a width (W3) of the first reinforcement part is less than a length (L2) of the second region.

4. The secondary battery of claim 1, wherein a width of the first region is greater than a width of the second region.

5. The secondary battery of claim 1, wherein a width of the first reinforcement part is less than a length of the first region.

6. The secondary battery of claim 1, wherein a length of the first reinforcement part is less than a length of the second region.

7. The secondary battery of claim 1, wherein the first collecting plate is substantially symmetrical along a longitudinal axis thereof.

8. The secondary battery of claim 1, wherein the first reinforcement part has a rounded corner.

9. The secondary battery of claim 1, wherein the first collecting plate comprises a single integral piece of material.

10. The secondary battery of claim 1, wherein an edge between the first reinforcement part and the second region is rounded.

11. The secondary battery of claim 1, wherein an edge between the first reinforcement part and the first region is arc-shaped.

12. The secondary battery of claim 1, wherein the first reinforcement part is integral with the first region.

13. The secondary battery of claim 1, wherein the first reinforcement part is integral with the second region.

14. The secondary battery of claim 1, wherein the first region and the second region are planar and wherein the first region is substantially perpendicular to the second region.

* * * * *